UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

PROCESS OF MAKING ACETYL-CELLULOSE PLASTIC COMPOUNDS.

1,136,248.     Specification of Letters Patent.     Patented Apr. 20, 1915.

No Drawing.     Application filed November 27, 1911. Serial No. 662,744.

*To all whom it may concern:*

Be it known that I, WILLIAM G. LINDSAY, a citizen of the United States, residing at Caldwell, county of Essex, State of New Jersey, have invented certain new and useful Improvements in Processes of Making Acetyl-Cellulose Plastic Compounds, of which the following is a specification.

The various compositions to which the present invention relates are employed in the arts, generally as imitations of natural substances, sometimes in their original finished form with or without incorporated colors and other inert substances, and sometimes as films which are used for photographic and other purposes.

Although the final or useful form of the different compounds of acetyl cellulose is that of a solid material, the different processes of conversion into this final solid form involve, as is well understood, the employment of solutions or mixtures of varying consistency as to plasticity, stiffness, or fluidity, depending generally upon the proportion and kind of solvent used to the amount of the original base,—acetyl cellulose.

It has long been known that camphor mixed with nitrocellulose upon the addition of ethyl alcohol becomes a solvent of the nitrocellulose in the cold or room temperature. I have found, however, that when that process is applied to acetyl cellulose no solvent action takes place, and the object of my invention was to find substances which when added to acetyl cellulose, would exert a solvent action upon the cellulose and produce a plastic mass which could be worked in a manner analogous to nitrocellulose-camphor compounds.

I have discovered that acetyl cellulose of the variety which is soluble in acetone can be made into plastic solids by the use of either tetrachlorethyl acetanilid or trichlormethyl acetanilid, or a mixture of the two, in conjunction with methyl alcohol in substantially equal proportions of the solids and the alcohol; and that the solvent will convert the cellulose and render the compound capable of being worked as in the case of the nitrocellulose-camphor plastic art.

As one example of practising my invention, I take 100 parts of an acetyl cellulose of the variety which is soluble in acetone and grind it or mix it with from 25 to 40 parts of either one of the above named solids, tetrachlorethyl acetanilid and trichlormethyl acetanilid, or with 25 to 40 parts of a mixture of the two solids. I then incorporate the mixture with from 40 to 50 parts of methyl alcohol by stirring, and allow the mass to soak or macerate at room temperature in a closed vessel until gelatinization of the mass has taken place. The compound can then be worked upon the rolls or in a heated press or mold, as is usual in the nitrocellulose-camphor art. The block or cake thus produced can be cut into sheets and dried in the usual way; or, if desired, the composition may be molded in a suitable heated mold into the final shape desired.

If it should be desired to use a smaller proportion of the solids, as may be necessary in order to produce a material having a high degree of hardness or solidity, and if this decrease in the amount of solids used results in a mixture having apparently little or no solvent action in the cold, gelatinization may be brought about by heating a mixture containing as low as 10 parts of the solid ingredients of the solvent to 100 parts of the acetyl cellulose (acetone soluble variety) and 50 or more parts of methyl alcohol. As to temperature, the most suitable one is easily ascertained by a few tests and depends upon the consistency desired. Placing the mixture in a suitable closed vessel and subjecting it to the temperature of a boiling water bath or a steam bath of 100° C. gives satisfactory results.

It must be noted that as the proportion of methyl alcohol to the solid ingredient or ingredients of the solvent increases beyond that of 1 to 1, the solvent action in the cold decreases rapidly, but it may be restored by the application of heat, and still further promoted by the joint application of heat and pressure. A proportion of 10 parts of the solid ingredient or ingredients of the solvent to 80 parts of methyl alcohol will produce a comparatively thin solution with the aid of heat and pressure. This may be useful in cases where a filtration can be done under the influence of heat and pressure. A solution thus produced will solidify when cold, but it is best to remove the excess of methyl alcohol by evaporation down to, say, equal parts of solids and methyl alcohol before cooling.

It will be understood that slight variations in the proportions of the ingredients of my new solvents and their proportion to the acetyl cellulose would not be a departure from the spirit of my invention, and it will likewise be understood by those skilled in the art that it is permissible to mix the acetyl cellulose and the other ingredients of my new solvents in any order desired, so long as solvent action is not permitted to take place so soon as to prevent incorporation of the cellulose with the ingredients of the solvent.

In construing the claims, it will be understood that trichlormethyl acetanilid is an equivalent of tetrachlorethyl acetanilid in the process of this invention, although it is preferable to use said tetrachlorethyl acetanilid.

Having thus described my invention, what I claim is:—

1. The process of making acetyl cellulose plastic masses which comprises incorporating an acetone-soluble acetyl cellulose with tetrachlorethyl acetanilid in the presence of a small proportion of methyl alcohol.

2. The process of making acetyl cellulose plastic masses which comprises incorporating an acetone-soluble acetyl cellulose with tetrachlorethyl acetanilid in the presence of a small proportion of methyl alcohol, the proportion of the alcohol being about one to one and one-half times the acetanilid ingredient.

WILLIAM G. LINDSAY.

Witnesses:
J. E. HINDON HYDE,
MABEL DENTON.